(12) United States Patent
Arai

(10) Patent No.: US 9,032,824 B2
(45) Date of Patent: May 19, 2015

(54) CONTROL DEVICE FOR DUAL CLUTCH TRANSMISSION AND CONTROL METHOD FOR DUAL CLUTCH TRANSMISSION

(75) Inventor: Katsuhiro Arai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 47 days.

(21) Appl. No.: 13/994,226

(22) PCT Filed: Dec. 5, 2011

(86) PCT No.: PCT/JP2011/006793
§ 371 (c)(1),
(2), (4) Date: Jun. 14, 2013

(87) PCT Pub. No.: WO2012/081191
PCT Pub. Date: Jun. 21, 2012

(65) Prior Publication Data
US 2013/0274062 A1    Oct. 17, 2013

(30) Foreign Application Priority Data
Dec. 15, 2010    (JP) ................................ 2010-279433

(51) Int. Cl.
*B60W 20/00* (2006.01)
*F16H 61/12* (2010.01)
(Continued)

(52) U.S. Cl.
CPC .............. *B60W 20/40* (2013.01); *Y10T 477/26* (2015.01); *F16H 61/12* (2013.01); *F16H 61/688* (2013.01); *F16D 48/064* (2013.01); *F16D 2500/1024* (2013.01); *F16D 2500/1086* (2013.01); *F16D 2500/5114* (2013.01); *Y10S 903/902* (2013.01); *F16D 2500/1117* (2013.01); *F16H 2061/128* (2013.01); *F16H 2061/122* (2013.01)

(58) Field of Classification Search
CPC ... F16H 2061/128; F16H 61/12; B60W 20/40
USPC .................................................. 74/337.5, 340
See application file for complete search history.

(56) References Cited

U.S. PATENT DOCUMENTS

| 5,966,989 A * | 10/1999 | Reed et al. ....................... 74/331 |
| 7,228,216 B2 * | 6/2007 | Inoue ................................. 701/67 |
| 8,402,859 B2 * | 3/2013 | Neelakantan et al. ..... 74/473.36 |

(Continued)

FOREIGN PATENT DOCUMENTS

| JP | 2000-055086 A | 2/2000 |
| JP | 2004-251456 A | 9/2004 |
| JP | 2004-308841 A | 11/2004 |

OTHER PUBLICATIONS

Official Communication issued in International Patent Application No. PCT/JP2011/006793, mailed on Mar. 6, 2012.

*Primary Examiner* — William Kelleher
*Assistant Examiner* — Terence Boes
(74) *Attorney, Agent, or Firm* — Keating & Bennett, LLP

(57) ABSTRACT

A control device for a dual clutch transmission includes a transmission control unit that determines immobility in an engaging-side clutch in a next stage as sticking and, when the engaging-side clutch in the next stage malfunctions and when a gear in a previous stage is out of engagement, engages the gear in the previous stage and thereafter controls a clutch torque capacity in the previous stage to a predetermined value, and a back torque limiter operates according to a predetermined condition to engage a release-side clutch in the previous stage.

7 Claims, 6 Drawing Sheets

(51) Int. Cl.
*F16H 61/688* (2006.01)
*F16D 48/06* (2006.01)

(56) References Cited

U.S. PATENT DOCUMENTS

| | | | |
|---|---|---|---|
| 8,578,803 B2* | 11/2013 | Neelakantan et al. | 74/337.5 |
| 8,794,091 B2* | 8/2014 | Saitoh | 74/340 |
| 2004/0166990 A1* | 8/2004 | Buchanan et al. | 477/174 |
| 2004/0166991 A1 | 8/2004 | Buchanan et al. | |
| 2004/0172184 A1 | 9/2004 | Vukovich et al. | |
| 2004/0204288 A1* | 10/2004 | Katakura | 477/80 |
| 2008/0026910 A1* | 1/2008 | Honma et al. | 477/149 |
| 2009/0078072 A1* | 3/2009 | Tsukada et al. | 74/335 |
| 2009/0143949 A1* | 6/2009 | Fukaya et al. | 701/67 |
| 2010/0042302 A1* | 2/2010 | Fritzer et al. | 701/62 |
| 2013/0261912 A1* | 10/2013 | Arai | 701/60 |

* cited by examiner

CONTROL DEVICE FOR DUAL CLUTCH TRANSMISSION AND CONTROL METHOD FOR DUAL CLUTCH TRANSMISSION

BACKGROUND OF THE INVENTION

1. Field of the Invention

The present invention relates to a control apparatus for a dual clutch transmission, i.e., a transmission including a plurality of clutches, and to a control method for the dual clutch transmission.

2. Description of the Related Art

A conventional dual clutch transmission, which is mounted on a motor vehicle and includes a plurality of clutches for fast gear changes of the motor vehicle, (referred to simply as "transmission" below in some cases) and a control apparatus to control the dual clutch transmission are known (see, for example, Japanese Patent Application Laid-Open No. 2004-251456 and Japanese Patent Application Laid-Open No. 2004-308841).

This transmission includes a plurality of clutches disposed between an engine and input shafts of the two transmission systems, each clutch being capable of transmitting a driving force or blocking the transmission of the driving force, and pairs of gears divided into the two systems (e.g., two systems of an odd transmission stage group and an even transmission stage group) that selectively connect between the input shafts of the two systems and a transmission output shaft (hereinafter referred to simply as "output shaft") according to a shifter selection.

In this transmission, while power is being transmitted to one of the pairs of gears in one transmission stage group that is connected to one of the clutches by engaging the one clutch and is selected by the shifter, the pairs of gears in the other transmission stage group corresponding to the other clutch can be kept in a neutral state, where no power is transmitted, by selecting with the shifter while the other clutch is held in engagement. That is, in a state where the two clutches are engaged, power can be transmitted from the output shaft to a drive wheel through the desired pair of gears in the transmission stage selected by the shifter.

Also, at the time of changing gears, the other clutch in the plurality of clutches associated with the transmission system of the transmission stage group not transmitting power is released. One of the pairs of gears in the transmission system including the input shaft connected to the other clutch is then selected and shifted into the target transmission stage. The other clutch is thereafter engaged while the one clutch that has been transmitting power is released.

That is, in the conventional dual clutch transmission, when a transmission stage is shifted from a selected and operational transmission stage (also referred to as "previous stage") to a target transmission stage (also referred to as "next stage"), a control apparatus performs interchange of the clutches by simultaneously operating the clutches, i.e., by releasing the clutch that is transmitting power and by engaging the clutch that transmits power to be transmitted through the following transmission stage (next stage) in a state where the pairs of gears in the two transmission systems are connected.

As described in Japanese Patent Application Laid-Open No. 2004-251456 and Japanese Patent Application Laid-Open No. 2004-308841, when controlling the conventional dual clutch transmission in which interchange between the plurality of clutches is performed while the clutches are being operated simultaneously, it is necessary to keep the sum of the torque capacities of the clutches simultaneously operated equal to a target value such as a value of the engine torque on a clutch portion from beginning to end of clutch interchange in order to avoid shift shocks (including a change in vehicle speed, and pitching) caused by the interchange as effectively as possible.

In the following description, a clutch that is being used and that is to be interchanged is referred to as a "release-side clutch", and a clutch that transmits a torque in engagement after gear change is referred to as an "engaging-side clutch".

Japanese Patent Application Laid-Open No. 2000-55086 discloses a clutch apparatus including a back torque limiter (referred to as "BTL" below as occasion demands) that relieves a back torque transmitted backward from the transmission apparatus to inhibit transmission of an excessively large back torque to the crank shaft.

There is a possibility of occurrence of immobility in the clutches such that the clutch does not move from the current state. Immobility is sometimes called "clutch sticking" (referred to as "sticking" below). The term sticking refers to immobility from the current state rather than adherence of a clutch. For example, the state of the clutch does not change from a state of being held out of engagement, the clutch remains out of engagement, and from a state of being held in engagement, the clutch remains engaged. There is a possibility of occurrence of the sticking in each of the release-side clutch and the engaging-side clutch. If sticking occurs in the release-side clutch, double engagement is caused by the BTL, so that braking is effected and a particularly large clutch malfunction does not occur.

In some cases of a dual clutch transmission including clutches with a BTL, however, when the engaging-side clutch is malfunctioning (sticking mechanically), and when the release-side gears are out of engagement, there is a possibility of failure to transmit a sufficiently large torque even if a control is performed to engage the two clutches.

In a case where the engaging-side clutch is sticking and an attempt is made to perform a final withdrawal operation after disengaging the gears (for example, after making a downshift from the second gear to the first gear), reengagement on the release side by disengaging the gears in the previous stage (second gear side in this case) cannot be performed after the transmission enters an inertia phase. That is, when the final withdrawal operation is performed after the gears are disengaged, the connection in the clutch can be established but the connection through the gears cannot be established since the gears are out of engagement. That is, since dogs are out of engagement and since the engaging-side clutch is sticking, a torque cannot be transmitted even if an attempt is made to establish the connection. This does not mean that a problem occurs immediately, since the transmission is in a power-off downshifting state. However, a subsequent attempt to accelerate brings about a state of the reduced torque on the engaging side, which gives a feeling as if the driving force is lost.

SUMMARY OF THE INVENTION

Preferred embodiments of the present invention provide a control apparatus for a dual clutch transmission and a control method for the dual clutch transmission that significantly reduces or prevents a malfunctioning behavior of a clutch in a vehicle or the like including the dual clutch transmission when the clutch malfunctions.

According to a preferred embodiment of the present invention, a control apparatus for a dual clutch transmission includes a first main shaft including odd-numbered transmission gears, a first clutch that transmits an engine torque to the first main shaft or blocks the transmission of the engine torque to the first main shaft, a second main shaft including even-numbered transmission gears, a second clutch that transmits the engine torque to the second main shaft or blocks the transmission of the engine torque to the second main shaft, an output shaft including driven gears arranged to mesh with the odd-numbered gears and the even-numbered gears, rotation from the first main shaft or the second main shaft being transmitted through the output shaft to a drive wheel, a back torque limiter that relieves a back torque transmitted backward from the transmission to inhibit transmission of an excessively large back torque to a crank shaft, and a transmission control unit programmed to control the first clutch and the second clutch in a clutch interchange period to change a path of transmission of the torque to shift from a previous stage to a next stage, in which the transmission control unit determines immobility in the clutch in the next stage as sticking and, when an engaging-side clutch in the next stage malfunctions and when a gear in the previous stage is out of engagement, engages the gear in the previous stage and thereafter controls the clutch torque capacity in the previous stage to a predetermined value, and the back torque limiter operates according to a predetermined condition to engage a release-side clutch in the previous stage.

According to a preferred embodiment of the present invention, there is also provided a control method for a dual clutch transmission that includes a first main shaft including odd-numbered transmission gears, a first clutch that transmits an engine torque to the first main shaft or blocks the transmission of the engine torque to the first main shaft, a second main shaft including even-numbered transmission gears, a second clutch that transmits the engine torque to the second main shaft or blocks the transmission of the engine torque to the second main shaft, an output shaft including driven gears arranged to mesh with the odd-numbered gears and the even-numbered gears, rotation from the first main shaft or the second main shaft being transmitted through the output shaft to a drive wheel, and a back torque limiter that relieves a back torque transmitted backward from the transmission to inhibit transmission of an excessively large back torque to a crank shaft, the method including the steps of controlling the first clutch and the second clutch in a clutch interchange period to change a path of transmission of the torque so that a shift from a previous stage to a next stage in transmission stages is made, determining immobility in an engaging-side clutch among the first clutch and the second clutch in the next stage as sticking in an inertia phase, and when the engaging-side clutch in the next stage malfunctions and when a gear in the previous stage is out of engagement, engaging the gear in the previous stage and thereafter controlling the clutch torque capacity in the previous stage to a predetermined value, and operating the back torque limiter according to a predetermined condition to engage a release-side clutch among the first clutch and the second clutch in the previous stage.

According to various preferred embodiments of the present invention, when a clutch malfunctions in a vehicle or the like including the dual clutch transmission, a malfunctioning behavior of the clutch can be significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the drawings.

A control apparatus for a dual clutch transmission according to the present preferred embodiment is arranged to change transmission stages by controlling the dual clutch transmission including a plurality of clutches. The present preferred embodiment will be described by assuming that a vehicle on which the control apparatus and the dual clutch transmission controlled by the control apparatus are mounted is a motorcycle. However, the present preferred embodiment is not limited to this. The control apparatus and the dual clutch transmission controlled by the control apparatus may be mounted on a four-wheel motor vehicle, a three-wheel motor vehicle or the like. Also, the dual clutch transmission may be a semiautomatic transmission such that a clutch operation at the start of travel and determination of shift change timing are left to a driver and the remaining portion of the control is automated, or may be a fully automatic transmission.

Figure 1:
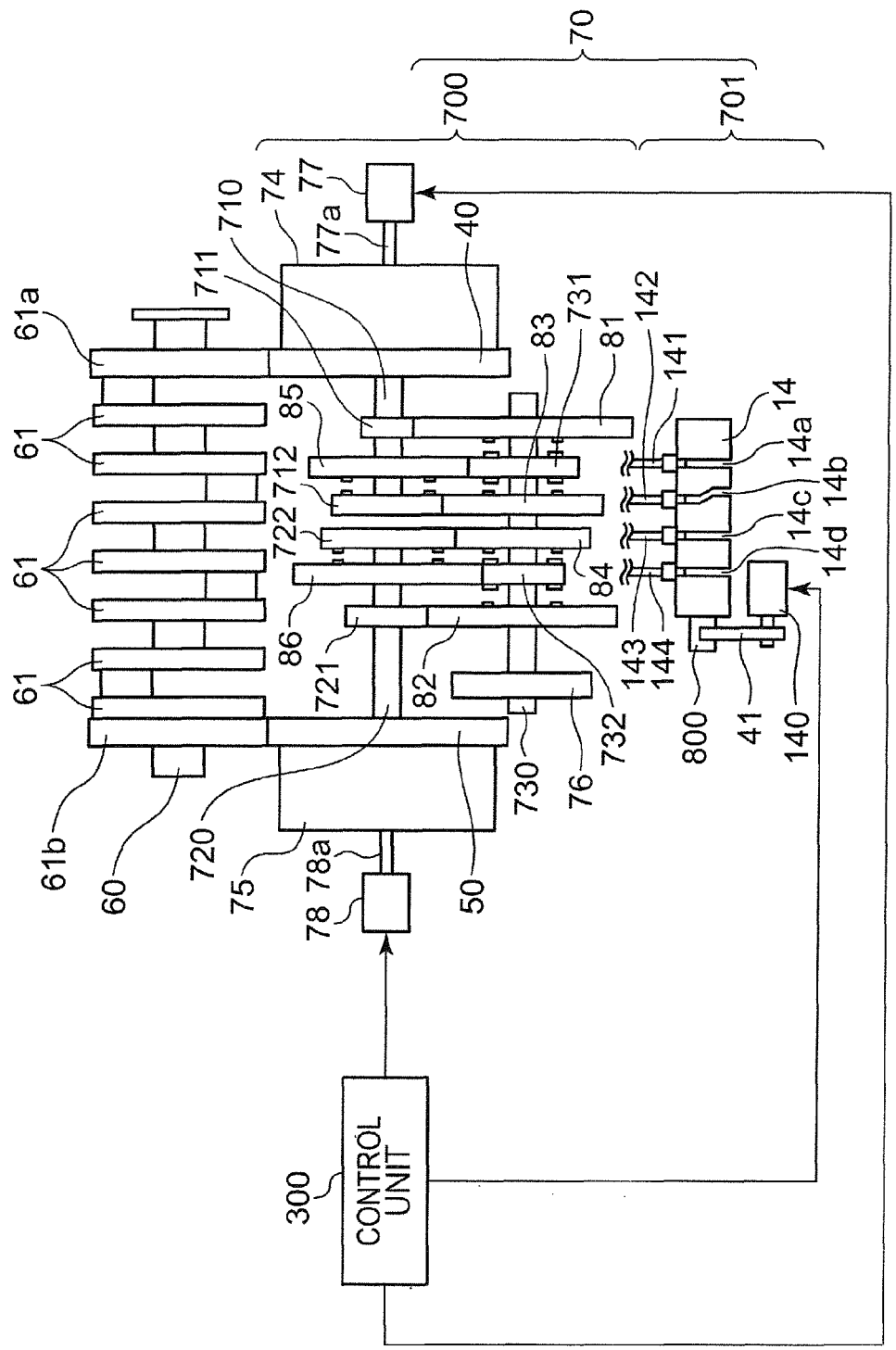
FIG. 1 is a schematic diagram showing the construction of a portion of a dual clutch transmission controlled by a control apparatus for the dual clutch transmission according to a preferred embodiment of the present invention.

The dual clutch transmission controlled by the control apparatus for the dual clutch transmission according to the present preferred embodiment will be outlined with reference to FIG. 1.

FIG. 1 is a schematic diagram showing the construction of a portion of dual clutch transmission 70 controlled by the control apparatus for the dual clutch transmission according to a preferred embodiment of the present invention.

Dual clutch transmission (hereinafter referred to as "transmission") 70 shown in FIG. 1 is a dual clutch transmission (DCT) with a Back Torque Limiter (BTL), in which a plurality of clutches (first clutch 74 and second clutch 75) are alternately interchanged to enable transmission of a driving force to a transmission gear in an odd stage or in an even stage.

The BTL relieves a back torque transmitted backward from the transmission to inhibit transmission of an excessively large back torque to the crank shaft.

As shown in FIG. 1, transmission 70 includes transmission mechanism 700 that is connected to crankshaft 60 of an engine and that transmits a torque transmitted from crankshaft 60 to a rear wheel (not illustrated) while changing the torque, and shift mechanism 701 that performs a change operation in transmission mechanism 700. Crankshaft 60 is disposed perpendicularly or substantially perpendicularly to the front-rear direction of the vehicle and substantially horizontally (in a lateral direction) in the motorcycle.

Crankshaft 60 includes a plurality of crank webs 61. Crank webs 61a and 61b in the plurality of crank webs, which are respectively disposed on one end and the other end of crankshaft 60, are each an external gear including gear grooves provided on its outer circumferential surface.

Crank web 61a meshes with first primary driven gear (also referred to as "first input gear") 40 in first clutch 74. Power transmitted from crank web 61a on the one end of crankshaft 60 to first input gear 40 by this meshing is transmitted from the one end of crankshaft 60 to first main shaft 710 of transmission 70 through first clutch 74.

Crank web 61b meshes with second primary driven gear (also referred to as "second input gear") 50 in second clutch 75. Power transmitted from crank web 61b on the other end of crankshaft 60 to second input gear 50 by this meshing is transmitted from the other end of crankshaft 60 to second main shaft 720.

Transmission mechanism 700 includes first main shaft 710, second main shaft 720 and drive shaft (output shaft) 730 disposed parallel or substantially parallel to crankshaft 60, first clutch 74, second clutch 75, gears 81 to 86, 711, 712, 721, 722, 731, and 732 through which power is transmitted between shafts 710 to 730, drive sprocket (hereinafter referred to simply as "sprocket") 76, and first and second clutch actuators 77 and 78.

In transmission mechanism 700, power transmitted to first and second main shafts 710 and 720 is transmitted to drive shaft 730 disposed at a rear position in the vehicle through gears selected as desired from gears 81 to 86, 711, 712, 721, 722, 731, and 732 constituting the transmission stages. Sprocket 76 is fixed on one end (left end) of drive shaft 730. A drive chain wound around a gear provided on a rotating shaft of the rear wheel (not illustrated) is wound around sprocket 76. As sprocket 76 rotates with the rotation of drive shaft 730, a driving force from transmission 70 is transmitted to the rear wheel, which is a drive wheel, through the drive chain (not illustrated). In other words, a torque produced in the engine is outputted from drive shaft 730 via first clutch 74 or second clutch 75 and one of predetermined gear trains corresponding to the transmission stages to rotate the rear wheel (drive wheel).

A power transmitting portion of first main shaft 710 through which a driving force is outputted to drive shaft 730 through gears in an odd stage (in gears 81, 83, 85, 711, 712, and 731) and a power transmitting portion of second main shaft 720 through which a driving force is outputted to drive shaft 730 through gears in an even stage (in gears 82, 84, 86, 721, 722, and 732) have outer diameters equal or substantially equal to each other. The power transmitting portion of first main shaft 710 and the power transmitting portion of second main shaft 720 are disposed on concentric circles without interfering with each other. In transmission mechanism 700, first main shaft 710 and second main shaft 720 having outer diameters equal or substantially equal to each other are disposed side by side in left and right positions on one axial line and are rotated independently of each other.

First main shaft 710 is connected to first clutch 74, while second main shaft 720 is connected to second clutch 75.

On first main shaft 710, transmission gears 711, 85 and 712 constituting the odd stages are disposed. More specifically, fixed gear (first-capable gear) 711, fifth gear 85 and spline gear (third-capable gear) 712 are disposed on first main shaft 710 in order from the base end to which first clutch 74 is connected.

Fixed gear 711 is integral with first main shaft 710 and rotates together with first main shaft 710. Fixed gear 711 meshes with first gear (driven-side gear) 81 on drive shaft 730. Fixed gear 711 is also referred to as "first-capable gear" in this description.

Fifth gear 85 is mounted on first main shaft 710 in a position between first-capable fixed gear 711 and third-capable spline gear 712 at certain distances from these gears so as to be rotatable about the axis of first main shaft 710 while being prevented from moving in the axial direction.

Fifth gear 85 meshes with spline gear (fifth-capable gear as a driven-side gear) 731 on drive shaft 730.

Spline gear 712 is mounted on first main shaft 710 at the fore end side, i.e., at the end remote from first clutch 74, so as to be rotatable with the rotation of first main shaft 710 and slidable along the axial direction.

More specifically, spline gear 712 is mounted on first main shaft 710 so as to be slidable along the axial direction while being prevented from rotating relative to first main shaft 710 by splines provided along the axial direction on the outer periphery of a fore end of first main shaft 710. Spline gear 712 meshes with third gear (driven-side gear) 83 on drive shaft 730. Spline gear 712 is connected to shift fork 142 and is moved on first main shaft 710 along the axial direction by the movement of shift fork 142. Spline gear 712 is also referred to as "third-capable gear" in this description.

Spline gear 712 is moved toward fifth gear 85 on first main shaft 710 to be brought into engagement with fifth gear 85, thus preventing fifth gear 85 from rotating (racing) about the axis on first main shaft 710. By engaging spline gear 712 with fifth gear 85, fifth gear 85 is fixed on first main shaft 710 to be able to rotate integrally with the rotation of first main shaft 710.

On the other hand, on second main shaft 720, transmission gears 721, 86 and 722 constituting the even stages are disposed. More specifically, fixed gear (second-capable gear) 721, sixth gear 86 and spline gear (fourth-capable gear) 722 are disposed on second main shaft 720 in order from the base end to which second clutch 75 is connected.

Fixed gear 721 is integral with second main shaft 720 and rotates together with second main shaft 720. Fixed gear 721 meshes with second gear (driven-side gear) 82 on drive shaft 730. Fixed gear 721 is also referred to as "second-capable gear" in this description.

Sixth gear 86 is mounted on second main shaft 720 in a position between second-capable fixed gear 721 and spline gear 722, which is a fourth-capable gear, at certain distances from these gears so as to be rotatable about the axis of second main shaft 720 while being prevented from moving in the axial direction. Sixth gear 86 meshes with spline gear 732 (sixth-capable gear as a driven-side gear) on drive shaft 730.

Spline gear (also referred to as "fourth-capable gear") 722 is mounted on second main shaft 720 at the fore end side, i.e., at the end remote from second clutch 75, so as to be rotatable with the rotation of second main shaft 720 and slidable along the axial direction.

More specifically, spline gear 722 is mounted on second main shaft 720 so as to be slidable along the axial direction while being prevented from rotating relative to second main shaft 720 by splines provided along the axial direction on the outer periphery of a fore end of second main shaft 720. Spline gear 722 meshes with fourth gear (driven-side gear) 84 on drive shaft 730. Spline gear 722 is connected to shift fork 143 and is moved on second main shaft 720 along the axial direction by the movement of shift fork 143.

Spline gear 722 is moved toward sixth gear 86 on second main shaft 720 to be brought into engagement with sixth gear 86, thus preventing sixth gear 86 from rotating (racing) about the axis on second main shaft 720. By engaging spline gear 722 with sixth gear 86, sixth gear 86 is fixed on second main shaft 720 to be able to rotate integrally with the rotation of second main shaft 720.

On the other hand, on drive shaft 730, first gear 81, spline gear (fifth-capable gear) 731, third gear 83, fourth gear 84, spline gear (sixth-capable gear) 732, second gear 82 and sprocket 76 are disposed in order from the first clutch 74.

On drive shaft 730, first gear 81, third gear 83, fourth gear 84 and second gear 82 are provided so as to be rotatable about drive shaft 730 while being prohibited from moving along the axial direction of drive shaft 730.

Spline gear (also referred to as "fifth-capable gear") 731 is mounted on drive shaft 730 so as to be slidable along the axial direction while being prevented from rotating relative to drive shaft 730 by spline engagement. That is, spline gear 731 is mounted so as to be movable relative to drive shaft 730 in a thrust direction and rotatable with drive shaft 730. Spline gear 731 is connected to shift fork 141 of shift mechanism 701. With a movement of shift fork 141, spline gear 731 is moved on drive shaft 730 along the axial direction.

Spline gear (also referred to as "sixth-capable gear") 732 is mounted on drive shaft 730 so as to be slidable along the axial direction while being prevented from rotating relative to drive shaft 730 by spline engagement. That is, spline gear 732 (sixth-capable gear) is mounted so as to be movable relative to drive shaft 730 in a thrust direction and rotatable with drive shaft 730. Spline gear 732 is connected to shift fork 144 of shift mechanism 701. With a movement of shift fork 144, spline gear 732 is moved on drive shaft 730 along the axial direction.

Sprocket 76 is fixed on an end of drive shaft 730 positioned at the second clutch 75.

Spline gears 712, 722, 731, and 732 function as transmission gears and also function as dog selectors. More specifically, projections and recesses fitting each other are provided on surfaces facing each other of spline gears 712, 722, 731, and 732 and the transmission gears adjacent to spline gears 712, 722, 731, and 732 in the axial direction. By fitting the projections and recesses to each other, each pair of gears rotates integrally.

Thus, spline gears 712, 722, 731, and 732 are moved in the axial direction by connected shift forks 141 to 144 so that each spline gear is connected to the transmission gear (in first gear 81 to sixth gear 86) adjacent to the spline gear in the axial direction by the dog mechanism.

First clutch 74 and second clutch 75 are spaced apart from each other in a direction (a left-right direction in the drawing) perpendicular or substantially perpendicular to the front-rear direction of the vehicle to hold first main shaft 710 and second main shaft 720 from opposite lateral sides of the vehicle.

First clutch 74 is provided between crankshaft 60 and first main shaft 710. In an engaging state, first clutch 74 transmits to first main shaft 710 rotational power supplied from the engine through crankshaft 60. In a free state, first clutch 74 blocks the transmission of rotational power from the engine to first main shaft 710. The torque transmitted to first main shaft 710 is outputted from drive shaft 730 through the desired pair of gears (a pair of gears in gears 711, 85, and 712 on first main shaft 710 and gears 81, 731, and 83 on drive shaft 730 corresponding to gears 711, 85, and 712) in the gears in the odd stages (gears, 81, 83, 85, 711, 712, and 731). First clutch 74 is preferably a well-known friction clutch of a multiplate structure.

Figure 2:
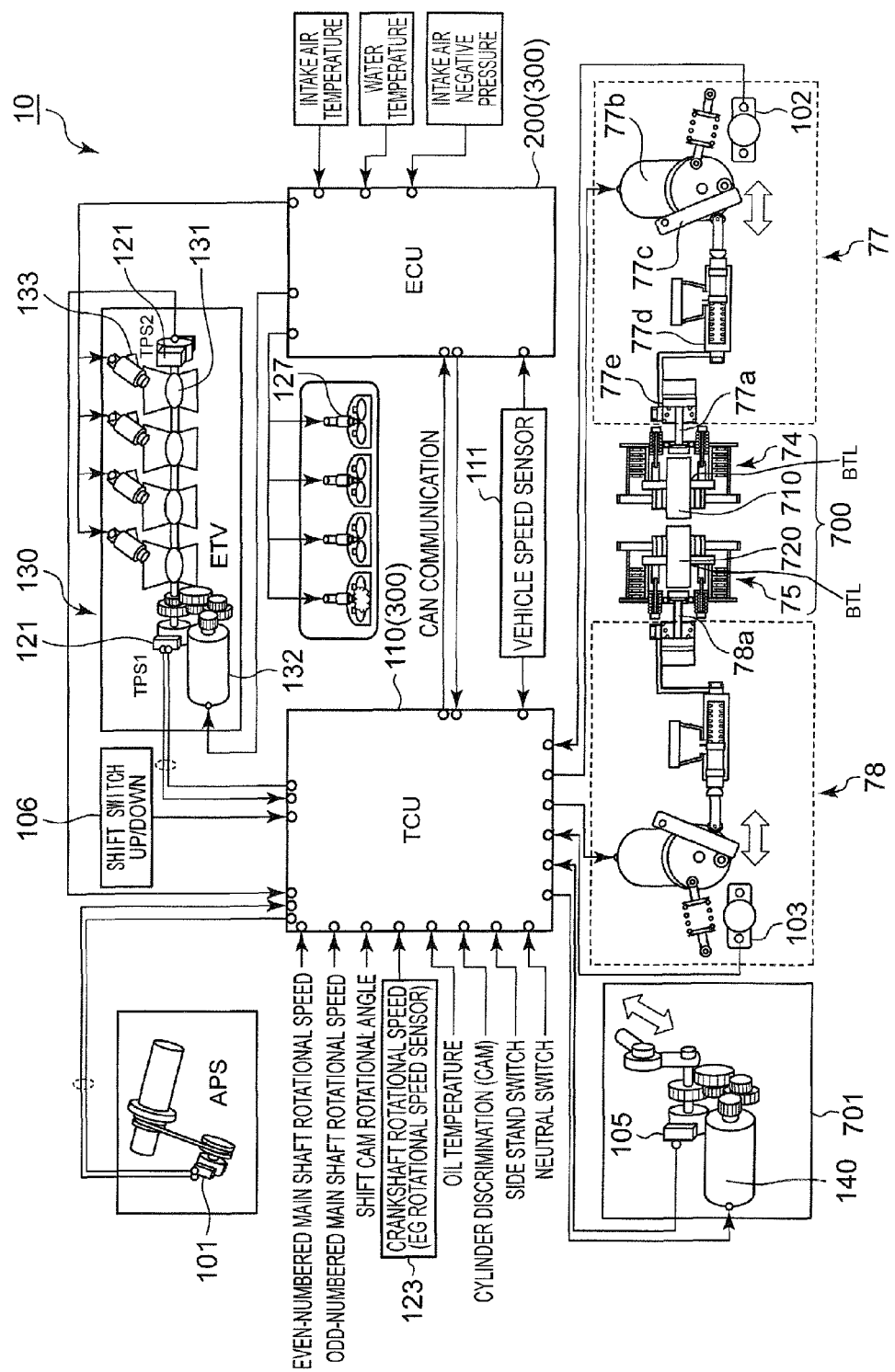
FIG. 2 is a schematic diagram showing a control system for a motorcycle including the control apparatus for the dual clutch transmission according to a preferred embodiment of the present invention.

First clutch 74 is connected to first pull rod 77a of first clutch actuator 77 controlled by a transmission control unit (TCU 110 shown in FIG. 2). In first clutch 74, when first pull rod 77a is moved in the direction away from first clutch 74, a plurality of clutch plates and a plurality of friction plates are separated from each other to cut the transmission of a torque from first input gear 40 to first main shaft 710, that is, to block the transmission of power to first main shaft 710. On the other hand, when first pull rod 77a is moved toward first clutch 74, the plurality of clutch plates and the plurality of friction plates attach closely to each other to transmit a torque to first main shaft 710, that is, to transmit power through odd-numbered gears including a group of odd gears (first gear 81, third gear 83 and fifth gear 85).

Second clutch 75 is provided between crankshaft 60 and second main shaft 720. Second clutch 75 is preferably a friction clutch of a multiplate structure, as is first clutch 74. In an engaging state, second clutch 75 transmits to second main shaft 720 rotational power supplied from the engine through crankshaft 60. In a free state, second clutch 75 blocks rotational power from the engine to second main shaft 720. The torque transmitted to second main shaft 720 is outputted from drive shaft 730 through the desired pair of gears (a pair of gears in gears 721, 86, and 722 on second main shaft 720 and gears 82, 732, and 84 on drive shaft 730 corresponding to gears 721, 86, and 722) in the gears in the even stages (gears, 82, 84, 86, 721, 722, and 732).

Second clutch 75, which is preferably a well-known clutch of a multiplate structure, as is first clutch 74, is connected to second pull rod 78a of second clutch actuator 78 controlled by transmission control unit 110. In second clutch 75, when second pull rod 78a is moved in the direction away from second clutch 75, a plurality of clutch plates and a plurality of friction plates are separated from each other to cut the transmission of a torque from second input gear 50 to second main shaft 720, that is, to block the transmission of power to second main shaft 720. On the other hand, when second pull rod 78a is moved toward second clutch 75, the plurality of clutch plates and the plurality of friction plates attach closely to each other to transmit a torque to second main shaft 720, that is, to transmit power through even-numbered gears including a group of even gears (second gear 82, fourth gear 84 and sixth gear 86).

Thus, first clutch 74 and second clutch 75 are driven and controlled by control unit 300 (more specifically by TCU 110 shown in FIG. 2) through first clutch actuator 77 and second clutch actuator 78.

Gear shifting to be performed on gears 81 to 86, 711, 712, 721, 722, 731, and 732 in transmission mechanism 700 is performed with shift forks 141 to 144 movable with the rotation of shift cam 14 in shift mechanism 701.

Shift mechanism 701 includes shift forks 141 to 144, shift cam 14, shift cam drive apparatus 800 that rotatingly drives shift cam 14, motor 140, and transfer mechanism 41 that connects motor 140 and shift cam drive apparatus 800 and transmits the driving force of motor 140 to shift cam drive apparatus 800.

Shift forks 141 to 144 extend between spline gears 731, 712, 722, and 732, respectively, and shift cam 14. Shift forks 141 to 144 are spaced apart from each other along the axial directions of first and second main shafts 710 and 720, drive shaft 730 and shift cam 14. Shift forks 141 to 144 are arranged parallel or substantially parallel to each other, each fork being movable along the axial direction of the axis of rotation of shift cam 14.

Shift forks 141 to 144 include pin portions on their base end sides movably disposed respectively in four cam grooves 14a to 14d provided on the outer circumferential surface of shift cam 14. In other words, shift forks 141 to 144 are driven members on shift cam 14 provided as a drive member. Shift forks 141 to 144 are slidingly moved along the axial directions of first and second main shafts 710 and 720 and drive shaft 730 according to the profiles of cam grooves 14a to 14d of shift cam 14. By this sliding movement, each of spline gears 731, 712, 722, and 732 connected to the extreme end is moved along the axial direction on the shaft passed through its bore.

Shift cam 14 preferably has a cylindrical shape and is disposed so that the axis of rotation is parallel or substantially parallel to first main shaft 710, second main shaft 720 and drive shaft 730.

Shift cam 14 is driven and rotated by the driving force of motor 140 transmitted to shift cam drive apparatus 800 through transfer mechanism 41. By this rotation, at least one of shift forks 141 to 144 is moved along the axial direction of the axis of rotation of shift cam 14 according to the profiles of cam grooves 14a to 14d.

With the movements of some of shift forks 141 to 144 movable by following the rotation of shift cam 14 including such cam grooves 14a to 14d, the spline gears connected to the moving shift forks are moved, thus performing gear shifting in transmission 70 (transmission mechanism 700).

In transmission 70, the driving force of the engine from crankshaft 60 is outputted through drive shaft 730 through one of the two independent systems including first main shaft 710 and second main shaft 720 by the operations of first clutch 74 and second clutch 75 and the corresponding operation of shift mechanism 701. With the rotation of drive shaft 730, driven sprocket 76 rotates to drive the rear wheel through the chain.

Shift mechanism 701 that drives first clutch 74, second clutch 75 and shift forks 141 to 144 in transmission 70 is controlled by control unit 300 in control system 10 (see FIG. 2).

FIG. 2 is a schematic diagram showing the control system for the motorcycle including the control apparatus for the dual clutch transmission according to a preferred embodiment of the present invention. In FIG. 2, the body of the engine is not illustrated.

In control system (control apparatus) 10 shown in FIG. 2, control unit 300 includes TCU (transmission control unit) 110 and ECU (engine control unit) 200. Between transmission control unit 110 and engine control unit 200, various sorts of data are exchanged as information by data communication such as CAN communication.

Control system 10 includes accelerator opening sensor (accelerator position sensor) 101, clutch position sensors (clutch angle sensors) 102 and 103, shift position sensor (transmission stage detection unit) 105, shift switch 106, first clutch actuator 77, second clutch actuator 78, shift mechanism 701 and output shaft rotational speed detecting sensor (referred to as "vehicle speed sensor") 111 as well as transmission control unit 110 and engine control unit 200.

Accelerator opening sensor 101 detects the opening amount of the driver's operation on the accelerator and outputs the detected operation amount to transmission control unit 110.

Clutch position sensors 102 and 103 detect positions of the respective clutches, i.e., the state of engagement in first clutch 74 attained by first actuator 77 and the state of engagement in second clutch 75 attained by second actuator 78, and output the detected clutch positions to transmission control unit 110. More specifically, clutch position sensor 102 outputs, from the angle of rotation of motor 77b, the amount of separation between a plurality of clutch plates and a plurality of friction plates adjusted by first pull rod 77a, i.e., the state of engagement in first clutch 74, to transmission control unit 110. Clutch position sensor 103 preferably has the same construction and the same function as clutch position sensor 102 and outputs the amount of separation between a plurality of clutch plates and a plurality of friction plates in second clutch 75, i.e., the state of engagement in second clutch 75 to transmission control unit 110.

Vehicle speed sensor (output shaft rotational speed detecting sensor) 111 detects the rotational speed of drive shaft 730 in transmission 70 (the drive shaft rotational speed corresponding to the vehicle speed) and outputs the detected rotational speed to transmission control unit 110 and engine control unit 200.

Shift position sensor 105 detects the position of the gears defining the predetermined transmission stages (the first to sixth gears, neutral) by the operation of motor 140 in shift mechanism 701 and outputs the detected gear position to transmission control unit 110.

Shift switch 106 includes a shift-up button and a shift-down button (not illustrated). By depressing the shift-up button or the shift-down button, transmission 70 achieves gear changes.

That is, when the driver depresses the shift-up button or the shift-down button of shift switch 106, a signal indicating that the button has been depressed (hereinafter referred to as "shift signal") is outputted from shift switch 106 to control unit 300. Control unit 300 controls first and second clutch actuators 77 and 78 and motor 140 based on this inputted shift signal. By this control, one of first and second clutches 74 and 75 or both clutches 74 and 75 are disconnected and shift cam 14 is rotated so that transmission 70 (more specifically transmission mechanism 700) performs gear shifting.

In the present preferred embodiment, an upshift operation is executed in transmission 70 in response to depressing the shift-up button by the driver, and a downshift operation is executed in transmission 70 in response to depressing the shift-down button by the driver.

First clutch actuator 77 adjusts an engaging force applied to first main shaft 710 in first clutch 74, i.e., a torque transmitted from first clutch 74 to first main shaft 710, based on a control command from transmission control unit 110. Transmission of power from the engine to first main shaft 710 or blocking of the transmission of the power from the engine to first main shaft 710 is performed in this manner to cause the vehicle to start or prevent.

First clutch actuator 77 in the present preferred embodiment adjusts the torque transmitted through first clutch 74 by hydraulic pressure. In first clutch actuator 77, motor 77b drive-controlled by transmission control unit 110 drives master cylinder 77d through a link 77c to supply a hydraulic operating fluid to slave cylinder 77e. By the hydraulic operating fluid flowing into slave cylinder 77e, first pull rod 77a urged toward first clutch 74 is moved in the direction away from first clutch 74. In first clutch 74, the engaging force, i.e., the transmitted torque, is thus reduced to block power from the engine (more specifically crankshaft 60) to first main shaft 710. With the movement of first pull rod 77a in a manner of being moved in the direction away from first clutch 74 as described above, first clutch 74 is made free. Also, first pull rod 77a driven by motor 77b is released from the state of being moved in the direction away from first clutch 74 to move toward first clutch 74. The clutching force (engaging force) of first clutch 74 is thus increased, so that the torque transmitted from the engine to first main shaft 710 is increased. At this time, first clutch 74 is in such a state that a certain torque is transmitted from the engine to first main shaft 710 through first clutch 74, i.e., in a clutching state.

Second clutch actuator 78 adjusts the engaging force applied to second main shaft 720 in second clutch 75, i.e., a torque transmitted from second clutch 75 to second main shaft 720, based on a control command from transmission control unit 110. As a result, transmission of power from the engine to second main shaft 720 or blocking of the transmission of the power from the engine to second main shaft 720 is performed in this manner to cause the vehicle to start or prevent.

Second clutch actuator 78 preferably has a construction similar to that of first clutch actuator 77 and drives second clutch 75 by the same operation as that by which first clutch actuator 77 drives first clutch 74.

Further, first clutch actuator 77 and second clutch actuator 78 achieve gear changes during traveling by operating first clutch 74 and second clutch 75 so that the torque transmission path in the transmission is changed.

While first clutch actuator 77 and second clutch actuator 78 are assumed to be of a hydraulic type in this description, first clutch actuator 77 and second clutch actuator 78 may be of any other type, e.g., an electric-type if they are constructed so as to adjust the engaging forces applied to the clutches.

Shift mechanism 701 is an apparatus to select the desired gears. Shift mechanism 701 selectively operates shift forks 141 to 144 (see FIG. 1) mounted in the transmission based on a control command from transmission control unit 110 to connect at least one of first main shaft 710 and second main shaft 720, which are transmission input shafts with drive shaft 730, thus defining a predetermined transmission stage.

Throttle opening sensor 121 detects the opening amount of throttle valve 131 of electronically controlled throttle 130 and outputs a signal representing the opening amount to transmission control unit 110.

Engine rotational speed sensor 123 detects engine rotational speed (more specifically rotational speed of crankshaft 60) Ne and outputs a signal representing the engine rotational speed to transmission control unit 110.

The opening of throttle valve 131 from throttle opening sensor 121 and the engine rotational speed Ne from engine rotational speed sensor 123 are inputted from transmission control unit 110 to engine control unit 200 through CAN communication together with information including the signal from accelerator opening sensor 101. That is, information inputted to transmission control unit 110 is inputted to engine control unit 200, and information inputted to engine control unit 200 is also inputted to transmission control unit 110 through CAN communication. Thus, transmission control unit 110 and engine control unit 200 share the inputted information with each other. Engine control unit 200 controls driving of the engine by using information inputted in this manner.

Transmission control unit 110 and engine control unit 200 control the components of the vehicle by using the inputted information.

Engine control unit 200 receives a required torque command to determine the torque of the engine from transmission control unit 110 and controls the torque of the engine.

Based on the received required torque command, engine control unit 200 controls the torque produced by the engine by operating electronically controlled throttle 130 or by changing ignition timing with ignition 127.

Electronically controlled throttle 130, injectors 133 on the engine and ignition 127 are connected to engine control unit 200. Engine control unit 200 controls the engine by using these connected components. Information including the intake air temperature, the water temperature and the intake air negative pressure is inputted to engine control unit 200 from connected sensors.

Electronically controlled throttle 130 adjusts the opening of throttle valve 131 provided in the engine air intake system by driving motor 132 based on a control command from engine control unit 200.

The sensors provided on the motorcycle are connected to transmission control unit 110. From the sensors, information including the accelerator opening, the engine rotational speed, the rotational speed of first main shaft 710 (shown as "odd-numbered main shaft rotational speed" in FIG. 2), the rotational speed of second main shaft 720 (shown as "even-numbered main shaft rotational speed" in FIG. 2), the angle of rotation of shift cam 14, the rotational speed of drive shaft 730, the oil temperature, the position of first clutch 74, the position of second clutch 75 and the position of the electromagnetic throttle valve is inputted to transmission control unit 110. Also, side stand switch (side stand SW) information from a side stand switch (not illustrated) and neutral switch (neutral SW) information from a neutral switch are inputted to transmission control unit 110.

Also, transmission control unit 110 controls the operations of first clutch actuator 77, second clutch actuator 78 and shift mechanism 701 at a predetermined timing, based on the inputted signals. By the operations of first clutch actuator 77, second clutch actuator 78 and shift mechanism 701, first clutch 74, second clutch 75 and the transmission gear stages are operated to perform a transmission stage change operation.

More specifically, transmission control unit 110 is programmed to calculate a target engine torque and a target clutch torque in response to a transmission stage command from shift switch 106 based on the inputted information items (the accelerator opening, the engine rotational speed, the rotational speed of first main shaft 710, the rotational speed of second main shaft 720, the rotational speed of drive shaft 730 and the angle of rotation of the shift cam).

Further, transmission control unit 110 calculates a target throttle opening, a target angle of rotation of shift cam 14 and a target clutch position in first clutch 74 or second clutch 75 based on the target engine torque and the target clutch torque.

By using the results of these calculations, transmission control unit 110 controls the operations of first clutch actuator 77, second clutch actuator 78 and shift mechanism 701, thus performing a transmission stage change operation to change the torque transmission path in a clutch interchange period. For example, in a gear change period (also referred to as the clutch interchange period), transmission control unit 110 operates the clutch in the next stage that transmits a torque to the pair of gears in the transmission stage after interchange, i.e., the next stage (target transmission stage),to increase the clutch torque capacity of the clutch in the next stage to the target value, and thereafter operates the clutch in the previous stage that transmits a torque to the pair of gears in the transmission stage before interchange, i.e., the previous stage, to reduce the clutch torque capacity of the clutch in the previous stage, thus changing the torque transmission path in transmission 70.

In the present preferred embodiment, transmission control unit 110 determines immobility in the clutch in the next stage as sticking and, when the clutch in the next stage malfunctions and when the gears in the previous stage are out of engagement, engages the gears in the previous stage and then engages the clutch in the previous stage.

More specifically, transmission control unit 110 determines immobility in the clutches as malfunctions due to sticking, makes a determination as to dog engagement for the even-numbered gears when the odd-numbered gear clutch malfunctions, and, if the even-numbered gears are out of dog engagement, dog-engages the even-numbered gears and thereafter engages the even-numbered gear clutch. Transmission control unit 110 makes a determination as to dog engagement for the odd-numbered gears when the even-numbered gear clutch malfunctions, and, if the odd-numbered gears are out of dog engagement, dog-engages the odd-numbered gears and thereafter engages the odd-numbered gear clutch. Transmission control unit 110 determines a malfunction in shift mechanism 701. When shift mechanism 701 malfunctions, transmission control unit 110 engages both the clutch in the next stage and the clutch in the previous stage. Engaging these clutches is a final withdrawal operation in changing the torque transmission path.

Determination as to a malfunction in the clutches or shift mechanism 701 is executed in inertia phase Inti_f in which the engine rotational speed is made equal to the rotational speed of the input shaft in the next stage at the time of gear change.

The gear change period is a period in which the torque transmission path is changed by the operation of first clutch 74 or second clutch 75, and which includes torque transmission preparation phase (also referred to as dog-in phase Dg_in_f), torque transmission path change phase (also referred to as torque phase Trq_f) and inertia phase Inti_f.

Torque transmission preparation phase Dg_in_f is a period for establishing a state in which a clutch interchange operation can immediately be performed in a phase after torque transmission preparation phase Dg_in_f, e.g., torque transmission path change phase Trq_f. More specifically, in torque transmission preparation phase Dg_in_f, one of first clutch 74 and second clutch 75 that becomes an engaging-side clutch is set in a state so as to produce the torque capacity immediately after receiving an operation command. That is, in torque transmission preparation phase Dg_in_f, the engaging-side clutch is moved to a position corresponding to a state immediately before engaging (a state in which the plurality of clutch plates and the plurality of friction plates are close to each other immediately before contact with each other). This state of the clutch is also referred to below as a state in which the clutch is at an engagement-ready position.

With respect to first and second clutch actuators 77 and 78 in the present preferred embodiment, torque transmission preparation phase Dg_in_f can also be said to be a period in which the pull rod of the clutch actuator for the engaging-side clutch is stroked to operate the engaging-side clutch to the engagement-ready position.

Torque transmission path change phase Trq_f is a period in which the clutches are actually operated, that is, the clutches are interchanged to change the torque transmission path, and which is a substantial gear change period. In the present preferred embodiment, transmission control unit 110 controls first clutch actuator 77 and second clutch actuator 78 to sequentially interchange the clutches one with another in torque transmission path change phase Trq_f.

In torque transmission path change phase Trq_f, transmission control unit 110 first operates the engaging-side clutch to set the clutch torque capacity on the engaging side to the target value, and thereafter operates the release-side clutch to set the clutch torque capacity on the release side to the target value.

In the present preferred embodiment, the target value of the clutch torque capacity in the engaging-side clutch is set to, for example, the engine torque (|Teg|) to be transmitted to the clutch portion, while the target value of the clutch torque capacity on the release side is set to 0. That is, transmission control unit 110 operates the engaging-side clutch so that the value of the clutch torque capacity on the engaging-side is changed from 0 to the engine torque value, thereafter operates the release-side clutch so as to equalize the value of the clutch torque capacity on the release-side to 0, and frees the release-side clutch.

In this torque transmission path change phase, the sum of the clutch torque capacity of the engaging-side clutch and the clutch torque capacity of the release-side clutch respectively operated by transmission control unit 110 is equal to or larger than the engine torque (|Teg|) and equal to or smaller than twice the engine torque (|Teg|).

Inertial phase Inti_f is a period in which correction of inertia accompanying change of the rotational speed is executed while an inputted rotational speed is changed to a value close to a rotational speed to be attained after the gear change. In other words, inertial phase Inti_f is a period in which the engine rotational speed is made equal to the rotational speed of the input shaft (first main shaft 710 or second main shaft 720) on a destination stage side (next stage) in the gear change. When there is a difference between the engine rotational speed and the rotational speed of the input shaft on the destination stage side, |the torque transmitted through the clutch (the torque actually transmitted)|=the clutch torque capacity (the maximum torque capacity by which the clutch can perform transmission). When there is no difference between the engine rotational speed and the rotational speed of the input shaft on the destination stage side, |the torque transmitted through the clutch (the torque actually transmitted)|≤the clutch torque capacity (the maximum torque capacity by which the clutch can perform transmission). In inertial phase Inti_f, in a power-on upshift state, the engine rotational speed is adjusted with the engaging clutch.

In inertial phase Inti_f, for example, in a power-on upshift state, the gear change actually progresses in the transmission path in the transmission to reduce the rotational speed of the input shaft (first or second main shaft 710 or 720) after the completion of clutch interchange from the release side to the engaging side. That is, in inertial phase Inti_f, transmission control unit 110 sets the engaging-side clutch in an engaging state to transmit power to drive shaft 730 through the engaging-side clutch. On the other hand, the release-side clutch in inertial phase Inti_f is made free by transmission control unit 110 in order to disengage dogs operated in gear change before the completion of gear change. The release-side clutch in inertial phase Inti_f is engaged after establishing a neutral state (freely rotatable stage) by disengaging the dogs.

The transmission stage change operation including the operations of first clutch 74 and second clutch 75 is performed by transmission control unit 110 by selecting a mode from four transmission control modes (also referred to as "control mode") according to a transmission command from the driver.

The four transmission control modes are modes according to transmission patterns to perform downshift during acceleration of the vehicle, upshift during acceleration, downshift during deceleration and upshift during deceleration.

In the gear change period in each of these four transmission control modes, transmission control unit 110 performs transmission control by controlling the operation of first clutch 74 through first actuator 77 and controlling the operation of second clutch 75 through second actuator 78. The gear change period in each transmission control mode is constituted of torque transmission preparation phase Dg_in_f, torque transmission path change phase Trq_f and inertia phase Inti_f.

Figure 3:
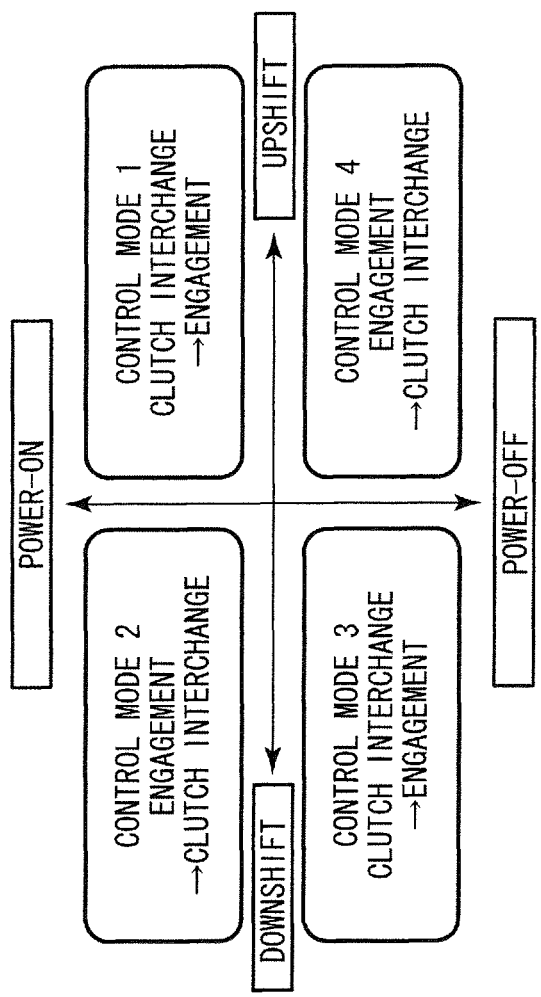
FIG. 3 is a diagram showing control mode quadrants corresponding to control patterns to perform gear change control.

FIG. 3 is a diagram showing control mode quadrants corresponding to control patterns to perform transmission control. In FIG. 3, "clutch interchange" designates the clutch operation in torque transmission path change phase Trq_f, and "engagement" designates the operation in the inertia phase and designates the engaging state of the clutch to which power is transmitted through the engaging-side clutch.

In control mode 1 shown in the first quadrant in FIG. 3, the engine torque is positive (power-on) when the engine torque is expressed by "positive/negative", and a shift to a higher one of the transmission stages (upshift) is made. This will be referred to as "power-on upshift state".

This power-on upshift state is a state in which a shift to a higher one of the transmission stages is made during acceleration, for example, an upshift from the first gear to the second gear is made during vehicle traveling. In the gear change period in control mode 1 shown in the first quadrant, transitions are made in order of torque transmission preparation phase Dg_in_f, torque transmission path change phase Trq_f and inertia phase Inti_f.

In control mode 2 shown in the second quadrant in FIG. 3, the engine torque is positive (power-on) when the engine torque is expressed by "positive/negative", and a shift to a lower one of the transmission stages (downshift) is made. This state is caused by so-called kickdown and will be referred to as "power-on downshift state".

This power-on downshift state is a state in which, for example, a shift to a lower one of the transmission stages is made to increase the torque on the drive wheel, and in which the load on the drive wheel is increased as in the case of uphill traveling. In the gear change period in control mode 2 shown in the second quadrant, torque transmission path change phase Trq_f and inertia phase Inti_f are interchanged in comparison with control mode 1 shown in the first quadrant. That is, in the gear change period in control mode 2 shown in the second quadrant, transitions are made in order of torque transmission preparation phase Dg_in_f, inertia phase Inti_f and torque transmission path change phase Trq_f.

In control mode 3 shown in the third quadrant in FIG. 3, the engine torque is negative (power-off) when the engine torque is expressed by "positive/negative", and a shift to a lower one of the transmission stages (downshift) is made. This will be referred to as "power-off downshift state".

This power-off downshift state is a state in which a shift to a lower one of the transmission stages is made during deceleration, for example, a downshift from the second gear to the first gear is made during vehicle traveling. In the gear change period in control mode 3 shown in the third quadrant, transitions are made in order of torque transmission preparation phase Dg_in_f, torque transmission path change phase Trq_f and inertia phase Inti_f.

In control mode 4 shown in the fourth quadrant in FIG. 3, the engine torque is negative (power-off) when the engine torque is expressed by "positive/negative", and a shift to a higher one of the transmission stages (upshift) is made. This will be referred to as "power-off upshift state".

This power-off upshift state is a state in which, for example, after kickdown is performed to cause acceleration and increase the vehicle speed, the accelerator is relaxed, and in which a shift to a higher one of the transmission stages is made and the load on the drive wheel is reduced.

In the gear change period in control mode 4 shown in the fourth quadrant, torque transmission path change phase Trq_f and inertia phase Inti_f are interchanged in comparison with control mode 3 shown in the third quadrant. That is, in the gear change period in control mode 4 shown in the fourth quadrant, transitions are made in order of torque transmission preparation phase Dg_in_f, inertia phase Inti_f and torque transmission path change phase Trq_f.

Figure 4:
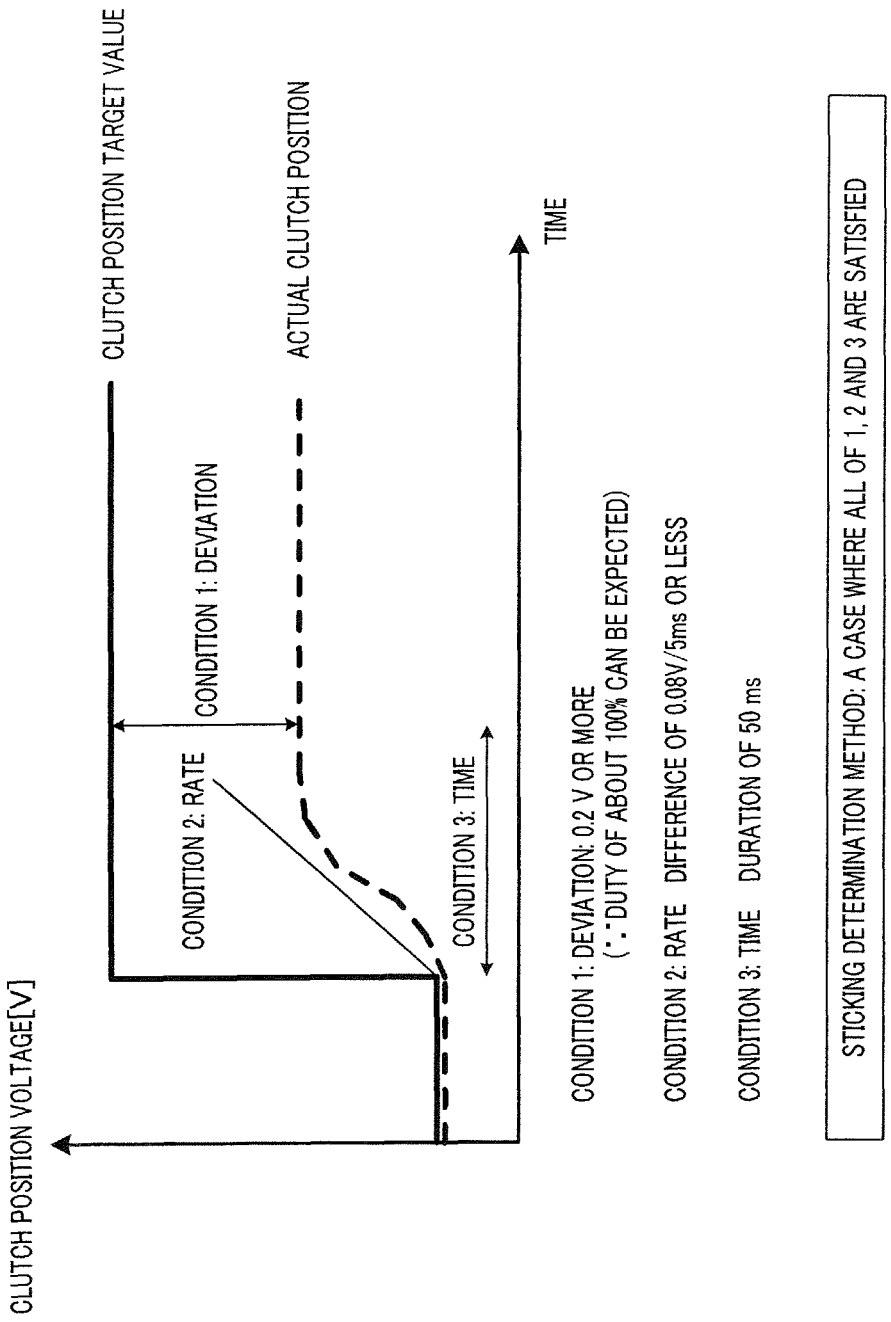
FIG. 4 is a diagram for explaining a method of determining clutch sticking.

FIG. 4 is a diagram showing a method of determining clutch sticking. The ordinate in FIG. 4 represents clutch position voltage and the abscissa represents a lapse of clutch operation time.

In the present preferred embodiment, the occurrence of clutch sticking is determined when all conditions 1 to 3 shown below are satisfied.

Condition 1: A deviation between the clutch position target value and the actual clutch position is 0.2 V, for example, or more.

Condition 2: A difference in the rate at which the actual clutch position follows the clutch position target value is 0.08 V/5 ms, for example, or less.

Condition 3: The duration for which the actual clutch position follows the clutch position target value at a certain rate is 50 ms, for example.

The above conditions 1 to 3 are only a non-limiting example. A combination of conditions selected from conditions 1 to 3 may be used.

Transmission control on transmission 70 in the latter half of DTC transmission in the motorcycle including control system 10 when the motorcycle is traveling will be described with reference to FIG. 5.

Figure 5:
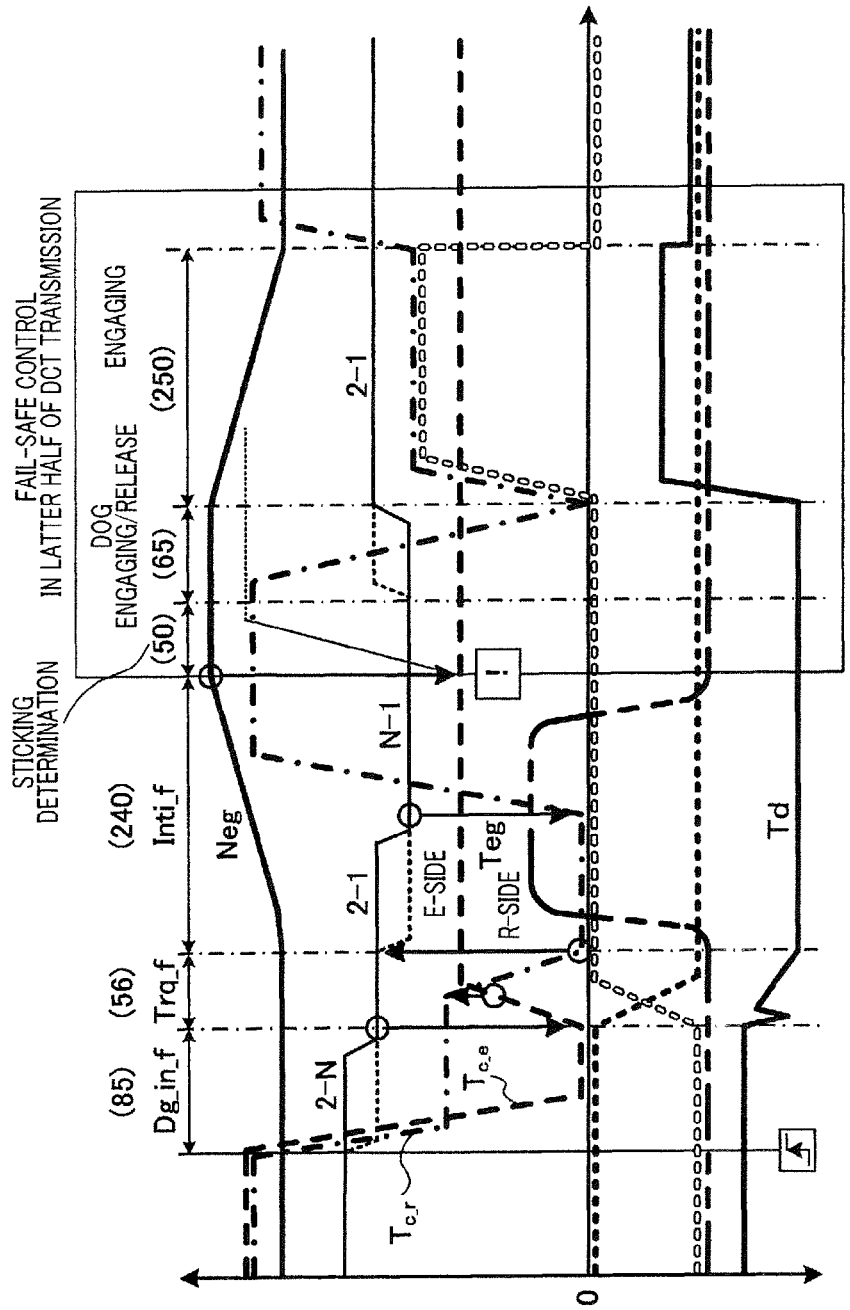
FIG. 5 is a time chart showing changes in torque and changes in rotational speed corresponding to the clutch operation in a latter half of DCT transmission.

FIG. 5 is a time chart showing changes in torque and changes in rotational speed corresponding to the clutch operation in a latter half of DTC transmission.

In FIG. 5, Tc_r is the torque capacity of the release-side clutch (abbreviated as "R" in the figure); Tc_e is the torque capacity of the engaging-side clutch (abbreviated as "E" in the figure); Tc_t is the sum of the torques transmitted through the two clutches; Neg is the engine rotational speed; and −Teg and Teg are engine torque values. The torque transmission preparation phase, the torque transmission path change phase and the inertia phase in the gear change period are denoted by Dg_in_f, Trq_f and Inti_f, respectively. Numeric values in ( ) in FIG. 5 designate time periods corresponding to the periods.

In FIG. 5, the plurality of graphs superposed one on another on the common abscissa are shown in a slightly shifted state for convenience sake. For example, graph Teg, Tc_r and Tc_e portions in the torque transmission path change phase Trq_f in FIG. 5 are superposed one on another in actuality.

Transmission control unit 110 controls drive of first clutch 74 through first actuator 77 and controls drive of second clutch 75 through second actuator 78. By controlling drive of first clutch 74 and second clutch 75 in this manner, transmission control unit 110 frees the clutch presently transmitting the torque and engages the clutch that transmits the torque to the pair of gears after shifting.

A torque transmission preparation operation is first performed in torque transmission preparation phase Dg_in_f.

That is, in control mode 1, transmission control unit 110 controls the clutch presently transmitting the torque (also referred to as "release-side clutch") in first clutch 74 and second clutch 75 in torque transmission preparation phase Dg_in_f to reduce the torque capacity Tc_r of the release-side clutch without reducing the transmitted torque (the sum Tc_t of the torques on clutches transmitted through the two clutches to the main shafts). Also, transmission control unit 110 controls the clutch that performs subsequent torque transmission (also referred to as "engaging-side clutch") in torque transmission preparation phase Dg_in_f in control mode 1 to reduce the torque capacity Tc_e of the engaging-side clutch without reducing the transmitted torque (the sum Tc_t of the torques on clutches transmitted through the two clutches to the main shafts).

More specifically, in torque transmission preparation phase Dg_in_f, the engaging-side clutch transmits no torque.

That is, the dogs on the power transmission path through the engaging-side clutch are out of engagement while the clutch is held in engagement. Accordingly, in torque transmission preparation phase Dg_in_f, transmission control unit 110 controls the engaging-side clutch to free the engaging-side clutch held in engagement, moves the engaging-side clutch to the preparatory position for interchange by engaging the gears in the next stage (more specifically, engaging the dogs), and engages the dogs.

Also, in torque transmission preparation phase Dg_in_f in control mode 1, transmission control unit 110 controls the release-side clutch to reduce the torque capacity Tc_r of the release-side clutch to a value substantially equal to that of engine torque Teg.

Thereafter, in torque transmission path change phase Trq_f, transmission control unit 110 operates the engaging-side clutch to reduce the clutch capacity Tc_e of the engaging-side clutch from 0 to the target value (engine torque Teg in this case) while maintaining the torque capacity Tc_r of the release-side clutch at engine torque Teg.

As shown in FIG. 5, in torque transmission path change phase Trq_f, after setting the clutch capacity Tc_e of the engaging-side clutch to the value corresponding to the engine torque (Teg) as described above, transmission control unit 110 operates the release-side clutch and disconnects this clutch. That is, the clutch capacity Tc_r of the release-side clutch maintained at the engine torque (Teg) is reduced to 0.

In this manner, transmission control unit 110 performs clutch interchange to change the torque transmission path in the transmission in torque transmission path change phase Trq_f.

Next, in inertia phase Inti_f, transmission control unit 110 performs control to transmit power to drive shaft 730 through the engaging-side clutch held in engagement to set the torque capacity Tc_e of the engaging-side clutch in this phase to a value equal to or larger than engine torque Teg.

Also in inertia phase Inti_f, while freeing the release-side clutch, transmission control unit 110 drives shift mechanism 701 to disengage the dogs in the transmission path including the release-side clutch to establish a neutral state (freely rotatable state), and thereafter engages the release-side clutch. Also in inertia phase Inti_f, the engine rotational speed is synchronized with the rotational speed of the transmission path through the engaging-side clutch.

An inertial torque is produced by this change in engine rotational speed Neg. In this state, the dogs on the first gear side that have been transmitting a driving force in the transmission path on the release-side clutch side are disengaged to set the release-side clutch capacity Tc_r to a neutral state, and the clutch is thereafter engaged. Different operations corresponding to this operation are performed according to other transmission systems. For example, in a pre-shifting-type system, dogs that transmit a torque to the next-stage pair of gears are engaged in advance and a clutch capable of transmitting the torque to the next-stage pair of gears is set in a disconnected standby stage.

Fail-safe control of the clutches in inertia phase Inti_f in the latter half of DTC transmission will be described below.

As shown in FIG. 5, in a case where a malfunction occurs in the torque on the engaging side in the latter half of DCT transmission, the severest malfunctioning behavior occurs in control mode 3 shown in the third quadrant in FIG. 3.

In a case where in inertia phase Inti_f a malfunction (mechanical sticking) occurs in the engaging-side clutch and the release-side gears are out of engagement, a sufficient torque cannot be transmitted even if control for engaging the two clutches is performed.

In a case where the engaging-side clutch is sticking and an attempt is made to perform a final withdrawal operation after disengaging the gears (for example, after making a downshift from the second gear to the first gear shown in FIG. 5), reengagement on the release side by disengaging the gears on the release side (second gear side in this case) cannot be performed after the transmission enters inertia phase Inti__f. That is, when the final withdrawal operation is performed after disengaging the gears, the connection in the clutch can be established but the connection through the gears cannot be established since the gears are out of engagement. That is, since the dogs are out of engagement and since the engaging-side clutch is sticking, torque transmission cannot be performed even if an attempt is made to establish the connection. The operation to establish the connection itself cannot be performed in DCTs other than the DCT with a BTL clutch (reverse clutch). If a DCT without a BTL malfunctions, no operation other than disconnecting the clutch can be performed. Details of clutch engagement on the release side by the BTL operation will be described below.

Because of the power-off downshift state, no serious problem occurs immediately. However, a subsequent attempt to accelerate brings about a state of the reduced torque on the engaging side clutch, which gives a feeling as if the driving force is lost.

That is, in inertia phase Inti__f, the torque in the case of deceleration is small. If the rider operates the accelerator for acceleration in this state, the engine races. For example, when a need arises to raise the vehicle body by accelerating after decelerating and cornering, the vehicle body cannot be raised.

In the present preferred embodiment, fail-safe control to be performed in a case where a malfunction occurs in the torque on the engaging side in the latter half of DCT transmission is provided.

More specifically, in the present preferred embodiment, in consideration of the problem that in a case where the engaging-side clutch is sticking and an attempt is made to perform a final withdrawal operation after disengaging the gears (after making a downshift from the second gear to the first gear shown in FIG. 5), reengagement on the release side by disengaging the gears on the release-side second stage side cannot be performed in inertia phase Inti_f, the dogs are reengaged after determining sticking to establish reengagement on the release side, thus securing the necessary torque when an attempt is made to accelerate in the power-off downshift state. In the above-mentioned example of cornering, the desired drive is maintained when a need arises to raise the vehicle body by accelerating after cornering deceleration, thus preventing falling down.

In the present preferred embodiment, as shown in FIG. 5, transmission control unit 110 determines a malfunction in the clutches and, when the clutch in the next stage malfunctions and when the gears in the previous stage are out of engagement, engages the gears in the previous stage and thereafter engages the clutch in the previous stage, thus performing a final withdrawal operation in changing the torque transmission path.

Engagement of the release-side clutch by a BTL operation will be described.

A case where the engaging-side clutch is sticking during a downshift and this fail-safe operation is performed will be described by way of example.

The BTL operates when the engaging-side clutch torque is larger than a torque at which the back torque limiter operates. In such a case, the release-side clutch torque is larger and engagement is effected on the release side.

If the engaging-side clutch torque is Tc_e; the release-side clutch torque is Tc_r; the engine torque is Te; and an engine inertia torque is −Je*dwe/dt, the relationship therebetween is shown by the following expression (1):

$$Tc\_r + Tc\_e = Te - Je*dwe/dt \quad (1)$$

In power-off downshifting, when sticking in the engaging-side clutch occurs in the latter half of transmission as in the case of fail-safe control in the latter half of this DCT transmission, Tc_r is positive because the rotational speed on the upstream side is higher; conversely, Tc_e is negative; and Teg is negative because of the power-off state.

According to the need to engage the release-side clutch, the engine rotational speed is reduced (dwe/dt is made negative) and Tc_r is controlled so that −Je*dwe/dt is positive.

Since Tc_r, Tc_e>>Te, Te is ignored for ease of understanding. Then, expression (1) can be modified into the following expression (2).

$$-Je*dwe/dt = Tc\_r + Tc\_e - Te > 0 \quad (2)$$

In order to satisfy the above expression (2), that is, in order to engage the release-side clutch, it is necessary to satisfy Tc_r>−Tc_e.

However, in a case where sticking occurs in the engaging-side clutch at a value close to the maximum torque capacity, Tc_r>−Tc_e cannot be satisfied.

The BTL is required in such a situation. The BTL operates at about −100 Nm, for example, and the maximum torque capacity of the clutch is 240 Nm, for example. Therefore, at any torque at which the engaging-side clutch sticks, the release-side clutch can be engaged to a sufficient degree. That is, the BTL does not operate in the case of sticking at −100 Nm or less, for example. The BTL operates in the case of sticking at a value higher than that.

Therefore, while transmission control unit 110 engages the dogs on the release side and controls the release-side clutch torque capacity to a suitable value, the BTL operates according to the condition to engage the release-side clutch. Thus, transmission control unit 110 engages the release-side clutch in cooperation with the BTL after engaging the gears on the release side.

This fail-safe control in the latter half of DCT transmission is based on a precondition of the DCT with the BTL. The BTL does not operate unfailingly, and the BTL alone is not capable of effecting engagement of the release-side clutch. It is thought that in many cases of sticking at a small engaging-side torque in particular, the BTL does not operate.

Figure 6:
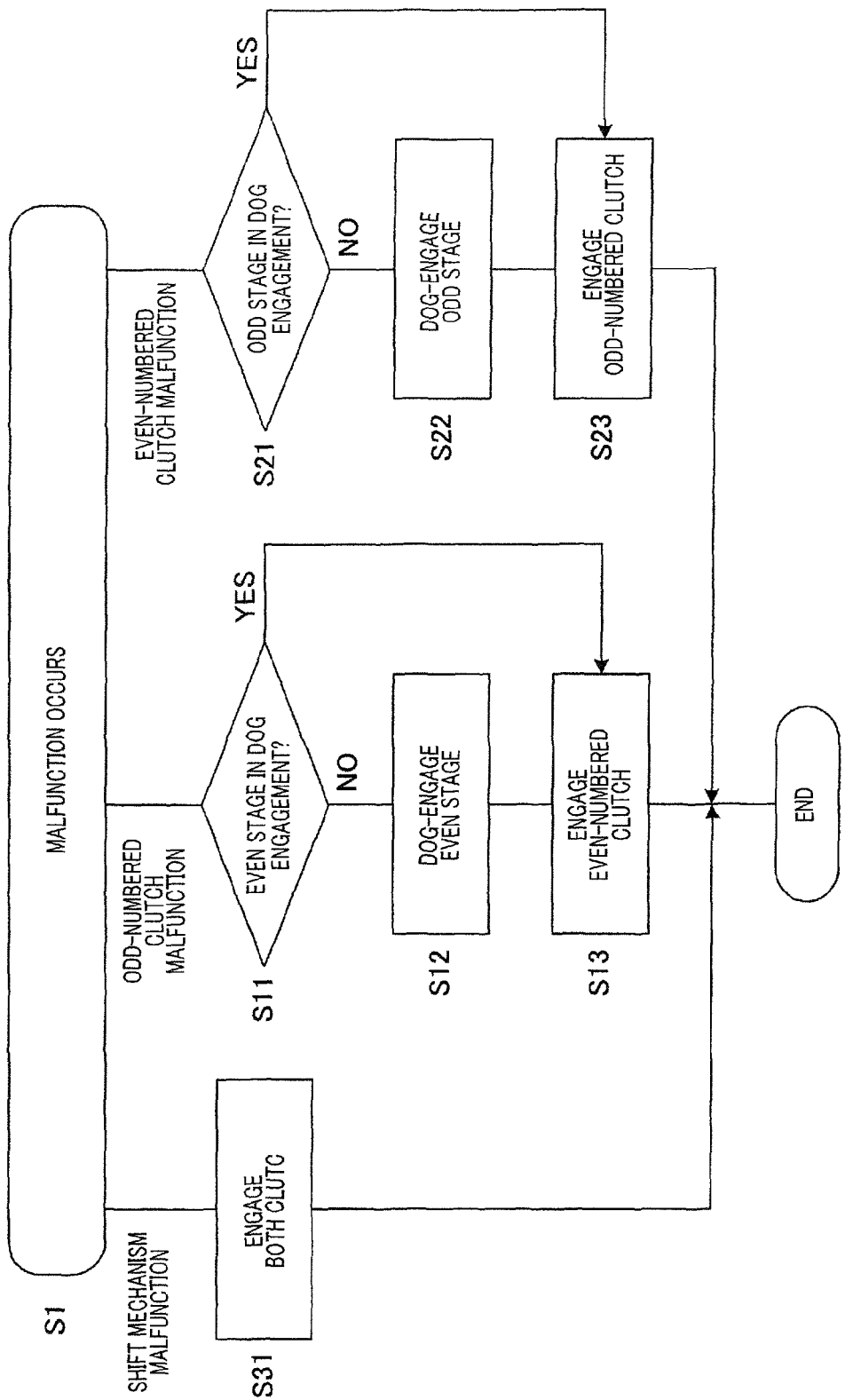
FIG. 6 is a flowchart of a fail-safe control operation in the latter half of DCT transmission.

FIG. 6 is a flowchart of fail-safe control operation in the latter half of DCT transmission. S in FIG. 6 denotes each step in the flow.

In step S1, transmission control unit 110 determines a malfunction in the clutches or shift mechanism 701. A malfunction in the clutches is detected by the determination of the occurrence of sticking of the clutches shown in FIG. 4. According to the place of a malfunction in the clutches or shift mechanism 701, the process proceeds to step S11, step S21 or step S31.

In the case of a malfunction of the odd-numbered gear clutch, transmission control unit 110 determines in step S11 whether or not the even-numbered gears on the normal side are held in dog engagement. Dog engagement is determined from the shift potential. When the shift cam moves, the potential of the rotational angle of the drum, i.e., the shift potential, is changed. From this change, determination as to whether or not dogs are held in engagement can be made.

If the even-numbered gears are out of dog engagement, transmission control unit 110 dog-engages the even-numbered gears in step S12, and then the process proceeds to step S13. If the even-numbered gears are held in dog engagement in step S11, the process proceeds directly to step S13.

In step S13, transmission control unit 110 engages the even-numbered gear clutch and performs the final withdrawal operation in changing the torque transmission path, and this flow ends.

For example, referring to FIG. 5, N-1 in the event of a malfunction (determination of sticking), and the dogs are reengaged to set 2-1, i.e., the second gear. That is, when the mechanism for the first gear malfunctions, the second gear is engaged.

In the case of a malfunction of the even-numbered gear clutch, transmission control unit 110 determines in step S21 whether or not the dogs for the odd-numbered gears on the normal side are held in engagement.

If the odd-numbered gears are out of dog engagement, transmission control unit 110 dog-engages the odd-numbered gears in step S22, and then the process proceeds to step S23. If the even-numbered gears are held in dog engagement in step S21, the process proceeds directly to step S23.

In step S23, transmission control unit 110 engages the odd-numbered gear clutch and performs the final withdrawal operation in changing the torque transmission path, and this flow ends. Dog engagement from the final withdrawal operation is difficult to perform. Moreover, if dog engagement is forcibly performed, a shift shock is caused.

On the other hand, if shift mechanism 701 malfunctions, transmission control unit 110 engages both the clutch in the next stage and the clutch in the previous stage and performs the final withdrawal operation in changing the torque transmission path in step S31, and this flow ends.

As described above in detail, in dual clutch transmission 70 in the present preferred embodiment, transmission control unit 110 determines immobility in the clutch in the next stage as sticking and, when the clutch in the next stage malfunctions and when the gears in the previous stage are out of engagement, engages the gears in the previous stage, then controls the clutch torque capacity in the previous stage to a predetermined value, and the BTL operates according to a predetermined condition to engage the clutch in the previous stage. That is, in a case where the odd-numbered gear clutch malfunctions, determination is made as to dog engagement of the even-numbered gears. If the even stage gears are out of dog engagement, the even-numbered gears are dog-engaged, and then the even-numbered gear clutch is engaged. In a case where the even-numbered gear clutch malfunctions, determination is made as to dog engagement for the odd-numbered gears. If the odd-numbered gears are out of dog engagement, the odd-numbered gears are dog-engaged, and then the odd-numbered gear clutch is engaged, thus performing the final withdrawal operating in changing the torque transmission path.

Double engagement is originally attained by the BTL to ensure safety. However, if the engaging side clutch sticks and the gears are out of engagement, double engagement cannot be effected. In the present preferred embodiment, sticking is determined, the dogs are reengaged and the release-side clutch is reengaged.

As a result, even in a case where a malfunction (mechanical sticking) occurs in the engaging-side clutch and the release-side gears are out of engagement, transmission of a sufficient torque is enabled by engaging the release-side gears and thereafter engaging the release-side clutch, thus significantly reducing or preventing the influence of the clutch malfunction on the vehicle.

In the present preferred embodiment, as shown in FIG. 5, engagement is effected on the release side at the torque necessary for engagement with the engine rotational speed. More specifically, transmission control unit 110 calculates the necessary release-side clutch torque capacity based on the difference in rotational speed, a target engagement time (about 250 ms, for example: a non-limiting value for reference) and the engaging-side clutch torque capacity, and controls the release-side clutch so that the corresponding torque is reached. Although double engagement is effected by the BTL, the double engagement is not effectively established when the torque on one side of the double engagement is 0. The engagement is established through torque control by taking a certain time period, thus applying a torque to one side of the double engagement so that the performance of control on the vehicle is improved.

The control apparatus for the dual clutch transmission according to preferred embodiments of the present invention is not limited to the above-described preferred embodiments. Various modifications and changes can be made to the preferred embodiments.

While a hardware configuration for preferred embodiments of the present invention has been described by way of example, preferred embodiments of the present invention can also be implemented by using software. For example, an algorithm for the control method for the dual clutch transmission according to preferred embodiments of the present invention may be described in a programming language, and this program may be stored in a memory and executed by the control unit for the motorcycle on which the dual clutch transmission is mounted to implement similar functions to those of the control apparatus for the dual clutch transmission according to preferred embodiments of the present invention.

Transmission control unit 110 used for the description of the preferred embodiments can typically be implemented by using an integrated circuit such as an LSI. Each of the functions of transmission control unit 110 may be provided in one chip, for example. All the functions or a portion of the functions may be provided in one chip, for example. The apparatus mentioned above as an LSI may be called an IC, a system LSI, a super LSI or an ultra LSI according to the degree of integration.

The entire contents of the specification, drawings and abstract contained in Japanese Patent Application No. 2010-279433, filed on Dec. 15, 2010 are incorporated herein by reference.

The control apparatus for a dual clutch transmission and the control method for the dual clutch transmission according to preferred embodiments of the present invention provide the advantage of significantly reducing or preventing a malfunctioning behavior of a clutch in a vehicle or the like including the dual clutch transmission when a malfunction occurs in the clutches and are useful as a transmission control apparatus for a motorcycle on which a dual clutch transmission is mounted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A control apparatus for a dual clutch transmission comprising:
a first main shaft including odd-numbered transmission gears;
a first clutch that transmits an engine torque to the first main shaft or blocks a transmission of the engine torque to the first main shaft;
a second main shaft including even-numbered transmission gears;
a second clutch that transmits the engine torque to the second main shaft or blocks the transmission of the engine torque to the second main shaft;
an output shaft including driven gears arranged to mesh with the odd-numbered transmission gears and the even-numbered transmission gears, rotation from the first main shaft or the second main shaft being transmitted through the output shaft to a drive wheel;
a back torque limiter that relieves a back torque transmitted backward to inhibit transmission of an excessively large back torque to a crank shaft; and
a transmission control unit that controls the first clutch and the second clutch in a clutch interchange period to change a path of transmission of the torque to shift from a previous stage to a next stage; wherein
the transmission control unit determines immobility in an engaging-side clutch among the first clutch and the second clutch in the next stage as sticking and, when the engaging-side clutch in the next stage malfunctions and when a gear in the previous stage is out of engagement, engages the gear in the previous stage, and thereafter controls a clutch torque capacity in the previous stage to a predetermined value, and the back torque limiter operates according to a predetermined condition to engage a release-side clutch among the first clutch and the second clutch in the previous stage.

2. The control apparatus for the dual clutch transmission according to claim 1, wherein
when an odd-numbered gear clutch among the first clutch and the second clutch malfunctions, the transmission control unit makes a determination as to dog engagement of an even-numbered gear and, if the even-numbered gear is out of dog engagement, dog-engages the even-numbered gear and thereafter engages an even-numbered gear clutch among the first clutch and the second clutch; and
when the even-numbered gear clutch malfunctions, the transmission control unit makes a determination as to dog engagement of the odd-numbered gear and, if the odd-numbered gear is out of dog engagement, dog-engages the odd-numbered gear and thereafter engages the odd-numbered gear clutch.

3. The control apparatus for the dual clutch transmission according to claim 1, wherein the transmission control unit determines a malfunction in a shift mechanism and, if the shift mechanism malfunctions, engages both the engaging-side clutch in the next stage and the release-side clutch in the previous stage.

4. The control apparatus for the dual clutch transmission according to claim 1, wherein during a gear change, the transmission control unit determines a malfunction in the first clutch or the second clutch in an inertia phase in which an engine rotational speed is made equal to a rotational speed of the input shaft in the next stage.

5. The control apparatus for the dual clutch transmission according to claim 1, wherein the transmission control unit causes engagement of the engaging-side clutch and the release-side clutch as a final withdrawal operation in changing the path of transmission of the torque.

6. The control apparatus for the dual clutch transmission according to claim 2, wherein the transmission control unit determines the sticking when a condition is satisfied with respect to at least one of a deviation between a clutch position target value and an actual clutch position, a rate at which the actual clutch position follows the clutch position target value, and a duration for which the rate continues for a predetermined period.

7. A motorcycle comprising:
   the control apparatus for the dual clutch transmission according to claim 1.

\* \* \* \* \*